T. J. GREEVES.
TRANSPARENT FLEXIBLE MATERIAL OR SHEET APPLICABLE FOR AEROPLANE WINGS AND OTHER PURPOSES.
APPLICATION FILED AUG. 2, 1918.
1,323,979.
Patented Dec. 2, 1919.
2 SHEETS—SHEET 2.
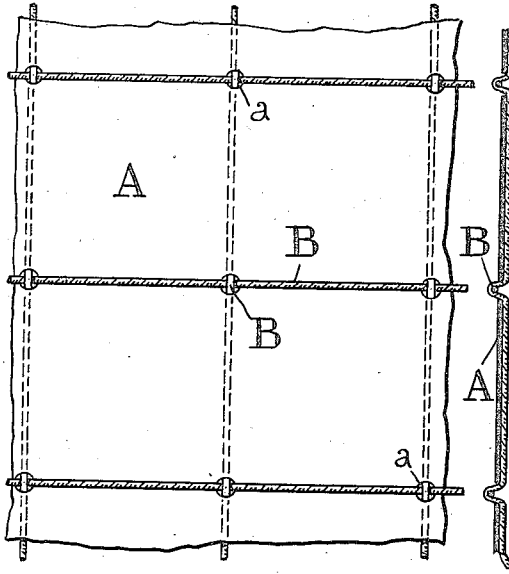
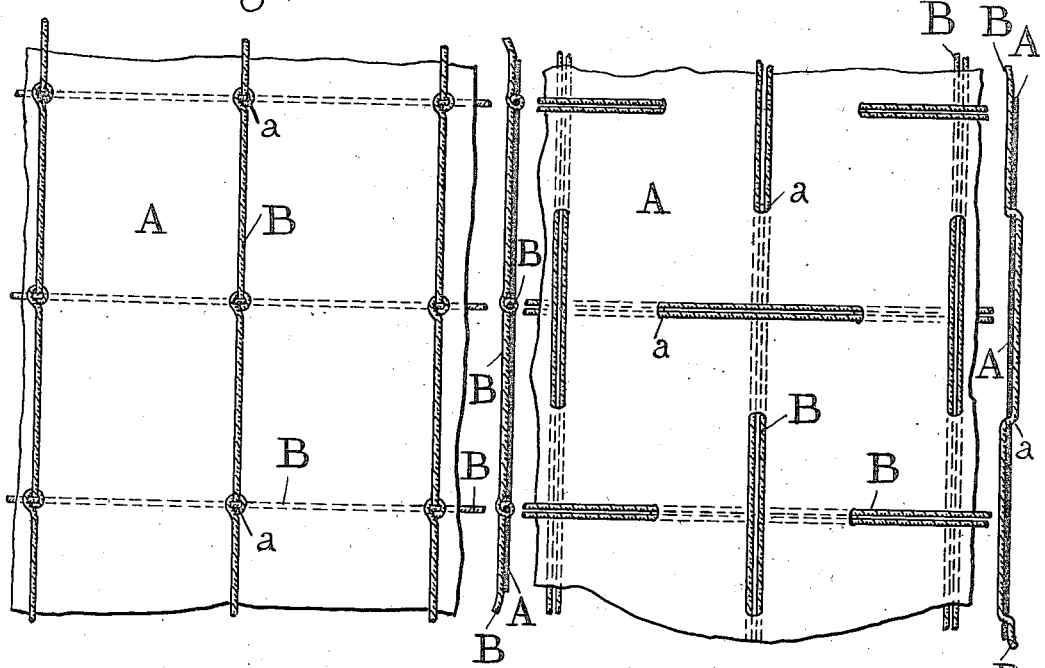

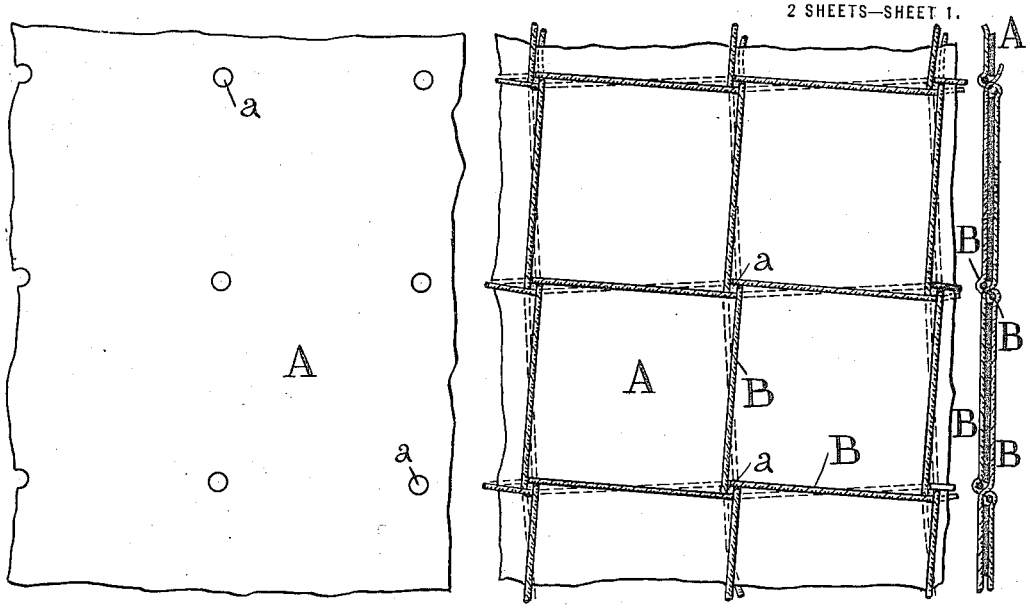
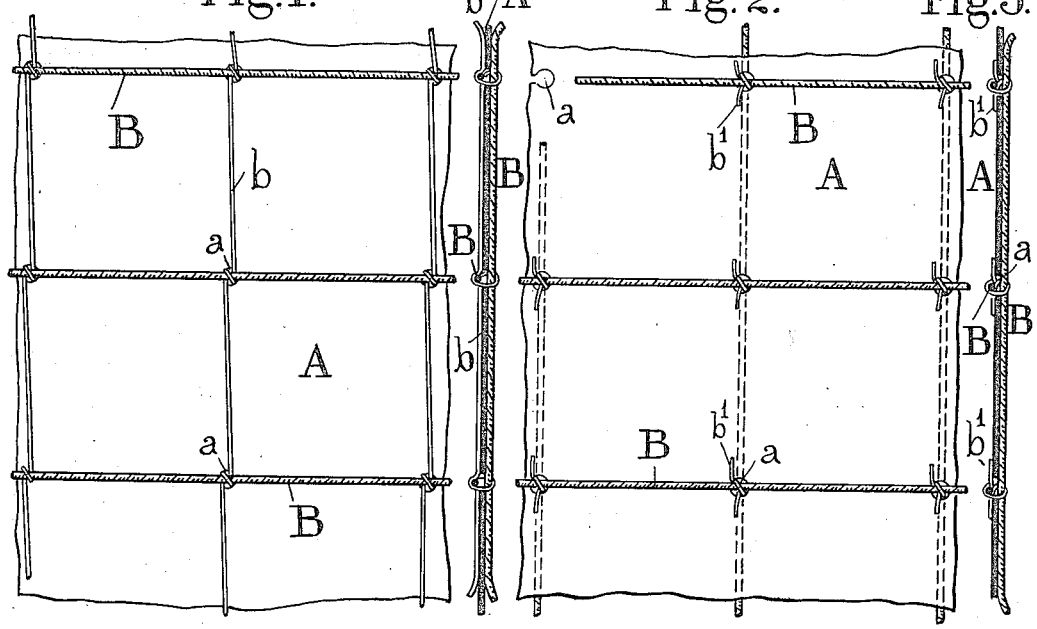
Fig.1. Fig.2. Fig.3. Fig.4. Fig.5. Fig.6. Fig.7.

UNITED STATES PATENT OFFICE.

THOMAS JACKSON GREEVES, OF PORTADOWN, IRELAND.

TRANSPARENT FLEXIBLE MATERIAL OR SHEET APPLICABLE FOR AEROPLANE-WINGS AND OTHER PURPOSES.

1,323,979.

Specification of Letters Patent.  Patented Dec. 2, 1919.

Application filed August 2, 1918. Serial No. 248,055.

*To all whom it may concern:*

Be it known that I, THOMAS JACKSON GREEVES, a British subject, residing at Portadown, County Armagh, Ireland, have invented certain new and useful Improvements in Transparent Flexible Material or Sheets Applicable for Aeroplane-Wings and other Purposes, of which the following is a specification.

This invention relates to a reinforced transparent flexible material made from celluloid, gelatin, talc, or other transparent flexible material for use on aeroplane wings, for windows and other purposes.

According to my invention I reinforce the transparent flexible material with flexible cords applied to one or both faces and secured at intervals through perforations therein which will relieve the material itself of the strain or stresses to which it would otherwise be subjected.

The reinforcing material is intended to perform two functions, viz: 1st, prevent the disintegration of the transparent sheet of celluloid or other material when subjected to pressure and (or) vibration; and 2nd, relieve the sheet of all tension and strains other than the pressure on the sections (or spaces) intervening between the reinforcing cords.

The invention will be fully described with reference to the accompanying drawings.

Figure 1 is a flat view of the transparent flexible material A showing holes or perforations $a$ for the reinforcing cords.

Figs. 2 and 3 are flat and sectional views of transparent flexible material showing one method of affixing or tying in the reinforcing cords.

Figs. 4, 5, 6, 7, 8, 9, 10, 11, 12, and 13 are flat and sectional views respectively of the transparent flexible material showing other methods of affixing or tying in the reinforcing cords.

The transparent flexible material is of well known substance or composition such as celluloid, or gelatin, talc or other materials, prepared in the ordinary way in sheets of the desired thickness and flexibility.

The sheet A is perforated at intervals with small holes $a$ by means of which reinforcing cords B laid upon the surface are interlaced or tied in.

In Figs. 2 and 3 (in which is shown the method I at present prefer) the reinforcing cords B are run in pairs each pair at certain equal distances apart, one cord of each pair to run on one side (or face) of the transparent material A and the other cord on the opposite side (or face) of the material for a certain distance, after which both the cords are passed through one of the holes $a$ in the material at the same spot, thus both cords crossing to opposite sides (or faces) and running thus for an equal distance, then each passing again through another hole $a$ in the material to the sides from which they had started, and so on. At right angles to these first described pairs of cords a similar series of cords will run in the same way, passing and repassing through the holes $a$ in the transparent material A at the same spot as did the first series of cords; thus at this spot of passing through the material two cords will be crossing two cords while all are passing from one side (or face) of the transparent material to the other side, and they can be made to intersect in such a way as to be woven together at this point in a form resembling a plain cloth weave.

The pairs of cords can also be made to twist around (or encircle) one another and thus nearly lie on top (so to speak) of one another while passing from one place of crossing to another on opposite sides of the sheet material.

In Figs. 4 and 5 the reinforcing cords B are laid upon both sides or faces of the sheet A at right angles to one another and are secured at the holes $a$ by another set of cords $b$ preferably thinner than the cords B and parallel to them on the opposite side being passed through each hole and under or around the cord on the other face of the sheet and back again to the first face thus tying in the cords B on the two faces of the sheet A.

In Figs. 6 and 7 the reinforcing cords B are laid upon both sides or faces of the sheet A at right angles to one another and are secured at the holes $a$ without passing into them or through them by a tying $b^1$ of thread or cord which is passed through each hole and tied tightly around the two cords B thus uniting or attaching the two cords.

In Figs. 8 and 9 and Figs. 10 and 11 the reinforcing cords B are laid on both sides or faces of the sheet those on one side of the sheet A at right angles to those on the other side of the sheet, the one cord being passed through the hole $a$ and over the other cord as in Figs. 8 and 9 or looped or knotted around it as in Figs. 10 and 11.

In Figs. 12 and 13 the interlacing cords B are laced through the holes $a$ alternately from side to side of the material, the longitudinal cords and the transverse cords passing through different holes and crossing at a point about midway between the holes though on opposite sides of the sheet, the cords being cemented into the holes through which they pass by a solution of celluloid or other cement.

Other forms of applying the reinforcing cords and securing them to one or both surfaces of the transparent flexible sheet A may be employed.

The reinforcing cords B where they pass through or across the holes $a$ may be affixed to one another and to the sheet by a suitable cementing material such as a solution of cellulose.

The reinforcing cords employed are preferably linen but may be of other textile fiber, silk or catgut, or of metal.

In fixing the material in position on the wings, the strands or cords are first drawn taut and fastened to the frame, relieving the fabric itself of tension after which the cementing material may be applied to close the lacing holes and unite the strands to the transparent material, the result being that the whole fabric is rendered more taut and drum like.

The transparent flexible material when the reinforcing cords are in position may be varnished over the reinforcing cords which will cause the cords to adhere to the surface, or in the case of aeroplanes the wings may be varnished over the reinforcing cords when the material is in position thereon.

What I claim as my invention and desire to protect by Letters Patent is:—

1. A transparent flexible material applicable for aeroplane wings and other purposes comprising a sheet of transparent flexible material such as celluloid, gelatin, talc, or the like with reinforcing cords applied to one or both surfaces and secured at intervals through perforations in the sheet so that all tension or strain comes upon the cords substantially as described.

2. A transparent flexible material applicable for aeroplane wings and other purposes comprising a sheet of flexible material provided with perforations at intervals and reinforcing cords laid on both sides and interlaced or tied together through the perforations substantially as described.

3. In a material applicable for aeroplane wings and other purposes the combination with a transparent sheet of flexible material provided with perforations at intervals of reinforcing cords laid upon both surfaces of the sheet at right angles to one another and interlaced through the perforations from one side of the sheet to the other substantially as described.

4. In a material applicable for aeroplane wings and other purposes the combination with a transparent sheet of flexible material provided with perforations at intervals of reinforcing cords laid upon both surfaces of the sheet at right angles to one another and material to close the perforations in the sheet substantially as described.

In testimony whereof I have hereunto set my hand in presence of two subscribing witnesses.

THOMAS JACKSON GREEVES.

Witnesses:
 OWDENT GREEVES,
 THOMAS REYNOLDS.